May 15, 1934.
F. D. CHAPMAN
1,959,122
LIQUID MEASURING DEVICE
Filed Dec. 31, 1931
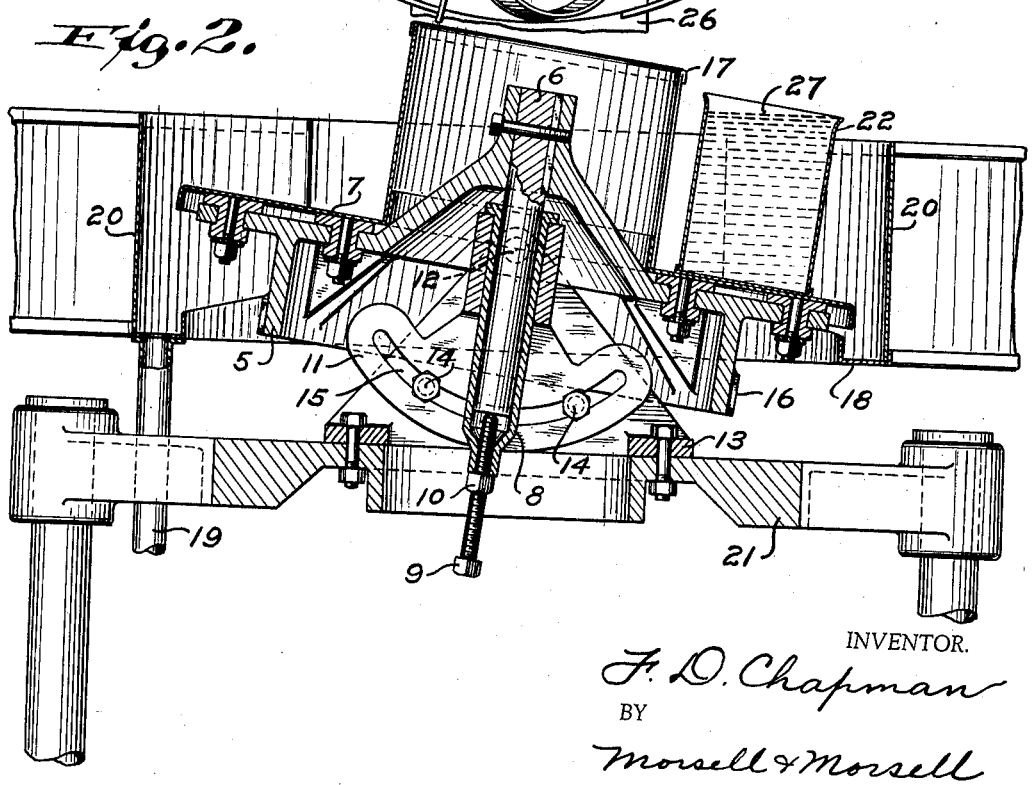
INVENTOR.
F. D. Chapman
BY
Morsell & Morsell
ATTORNEY.

Patented May 15, 1934

1,959,122

UNITED STATES PATENT OFFICE 1,959,122

LIQUID MEASURING DEVICE

Frank D. Chapman, Berlin, Wis.

Application December 31, 1931, Serial No. 584,097

18 Claims. (Cl. 226—22)

The present invention relates generally to improvements in the construction and operation of devices for automatically measuring batches of liquid in succession.

It has long been customary in the canning industry, in cases where a filler did not accurately pre-measure the material delivered to successive cans of a series, to urge the filled cans along an inclined guide or runway, so as to permit a relatively small amount of the liquid to overflow from the overfilled cans, and thus produce successive equal batches of the material. In other words, the cans themselves were utilized as the final measuring means, and the degree of tilt of the cans during their passage over the inclined runway, determined the extent of filling of the successive cans and hence also determined the volumes of the measured batches. These prior inclined guides or runways were objectionable because the successive cans contacted with each other as they were slid along the stationary inclined supports and frequently became jammed and bent out of shape, and also because they did not provide conveniently operable and effective means for varying the degree of tilting so as to change the volume of the measured batches.

The present invention contemplates the provision of a liquid measuring device which obviates all of the above-mentioned defects of the prior can tilting measuring means.

Another object of the invention is to provide an improved measuring device for producing equal successive batches of liquid, both accurately and automatically.

A further object of the invention is to provide a liquid measurer especially adapted for use in connection with tin cans, wherein danger of crushing and deformation of the cans is eliminated.

Still another object of the invention is to provide for convenient and accurate adjustment of a liquid measuring device, so as to produce measured quantities of any desired volume.

Another object of the invention is to provide an improved liquid measuring device which is simple in construction, and which is moreover flexible and highly efficient in operation.

These and other objects and advantages will be apparent from the following detailed description.

A clear conception of an embodiment of the invention and of the mode of constructing and of manipulating liquid measuring devices built in accordance therewith, may be had by referring to the drawing accompanying and forming a part of this specification in which like reference characters designate the same or similar parts in the several views:

Fig. 1 is a top view of an improved automatic liquid measuring device; and

Fig. 2 is a central vertical section through the liquid measuring device of Fig. 1, the section being taken along the line 2—2 of Fig. 1.

Referring to the drawing, the improved liquid measuring device comprises in general a frame 5 rigidly attached to a central supporting shaft 6 and having mounted thereon a can support or disc 7. The shaft 6 is rotatably mounted in a carrier sleeve 8 and is adjustable within the sleeve by means of a bolt 9 and lock nut 10. The sleeve 8 is rigidly attached to a bracket 11 having supporting trunnions 12 and the bracket 11 is adapted to be adjustably locked into position relative to a stationary frame 13 by means of bolts 14 coacting with a slot 15 formed in the bracket 11. The frame 5 together with the elements supported thereby, is adapted to be rotated about the axis of the shaft 6 by means of teeth 16 formed on the lower peripheral portion of the frame 5 and coacting with a suitable driving gear. The central portion of the frame 5 is surrounded by an annular wall 17, and may project above the top of the can support or disc 7 as shown, in order to reduce the vertical height of the device to a minimum, and also in order to enable disposition of the trunnions 12 at the proper place.

Disposed beneath the periphery of the can supporting disc 7 is a trough 18 having a drain pipe 19, and the outer wall 20 of this trough may be extended considerably above the disc 7, as illustrated. The trough 18 and the stationary frame 13 may be supported upon frame structure 21 as shown, and this frame structure may constitute part of the frame of a machine which admits liquid to the successive cans. The successive cans 22 are fed upon the can supporting disc 7 from a filler or other mechanism for introducing liquid into the cans 23 and guides 24. The can supporting surface of the disc 23 is disposed horizontally and the location of the trunnions 12 must be such that the portion of the upper surface of the disc 7 which is adjacent to the supply disc 23, will not be above the can supporting surface of the disc 23. This will permit the successive cans 22 to gradually leave the rotating horizontal disc 23 and to slide upon the oppositely rotating inclined can supporting disc 7. Disposed above the inclined disc 7 and at the side thereof oppositely to the can supply portion, is another guide 25 which is adapted to deliver the successive cans 22 onto a discharge conveyor 26, and the can receiving surface of the conveyor 26 must likewise be so disposed that the cans 22 will readily slide from the inclined disc 7 to the conveyor 26 without danger of spilling the contents.

During normal operation of the improved liquid measuring device, the support or disc 7 is being rotated by power applied to the gear teeth 16, in the direction of the arrow indicated in Fig. 1. The successive liquid filled cans 22 are delivered by the supply disc 23 and guides 24 upon the upper advancing surface of the inclined disc 7, and as the cans become fully positioned upon the disc 7 they will be inclined and the liquid therein will assume the level indicated at 27 in Fig. 2. The liquid spilled from the cans 22 during this tilting operation escapes into the drain trough 18 and from thence to the drain pipe 19 and may be returned to the filler in any suitable manner. When the successive cans 22 reach the discharge guide 25 they are automatically removed from the inclined disc 7 to the conveyor 26, and each of the successive cans 22 then contains the same quantity of liquid as every other can passing through the measuring device.

It will be apparent that for a predetermined inclination of the shaft 6, the cans 22 will be filled to a predetermined extent. By varying the inclination of the shaft 6, the quantity of liquid finally contained in each can 22 may be readily varied. Such adjustment can be conveniently made by loosening the clamping bolts 14 coacting with the slot 15, and by swinging the bracket 11 about the trunnions 12. In order to maintain proper coaction between the inclined disc 7 and the horizontal can supply disc 23, it is only necessary to adjust the central screw 9 either up or down, and to apply the lock nut 10 after proper positioning of the can supporting discs has been attained.

From the foregoing description it will be apparent that the present invention provides simple and highly effective mechanism for automatically measuring any predetermined quantities of liquid, in succession. The cans 22 are never subjected to jamming and possible distortion, and the volume of the liquid can be varied quickly and accurately. The successive cans 22 are conveyed about the axis of the shaft 6 in tilted position and in spaced relation, and the spilled liquid is recovered and is available for use in subsequent containers. The annular walls 17, 20 prevent undesirable loss of spilled liquid and also serve to maintain the apparatus in highly sanitary condition. It will also be understood that the driving gear 16 and its cooperating propelling gear, have their teeth so formed with clearances and with rounded driving surfaces, that a proper drive is maintained irrespective of the adjustment of the inclination and height of the driving shaft.

It should be understood that it is not desired to limit the invention to the exact details of construction and to the precise mode of operation, herein shown and described, for various modifications within the scope of the claims may occur to persons skilled in the art.

It is claimed and desired to secure by Letters Patent:

1. In combination, a supporting disc rotatable about an inclined axis, means for delivering liquid filled containers in succession to and from diametrically opposite peripheral portions of the inclined supporting surface of said disc, and means for effecting adjustment of said disc along the axis of rotation thereof and vertically relative to said delivery means.

2. In combination, a supporting disc rotatable about an inclined axis, means for delivering liquid filled containers in succession to and from the inclined supporting surface of said disc, and means for varying the inclination of said axis.

3. In combination, a supporting disc having a movable inclined upper surface formed to sustain open topped containers in tilted position, means for delivering liquid filled containers in succession to and from horizontally opposite portions of said disc, and means for effecting vertical adjustment of said disc relative to said delivery means.

4. In combination, a support having a movable inclined upper plane surface formed to sustain open topped containers in tilted position, means for delivering liquid filled containers in succession to and from said surface at horizontally opposite portions of said support, and means for varying the inclination of said surface.

5. In combination, an inclined shaft, a disc having a supporting surface disposed perpendicular to the axis of said shaft, means for delivering liquid filled containers in succession to and from said surface at diametrically opposite horizontally alined portions of said disc, means for rotating said disc through said shaft, and means for effecting adjustment of said disc along the axis of said shaft and vertically relative to said delivery means.

6. In combination, an inclined shaft, a disc having a supporting surface disposed perpendicular to the axis of said shaft, means for delivering liquid filled containers in succession to and from said surface, means for rotating said disc through said shaft, and means for varying the inclination of said shaft.

7. In combination, an inclined shaft, a disc having a supporting surface disposed perpendicular to the axis of said shaft, means for delivering liquid filled containers in succession to and from said surface, means for rotating said disc through said shaft, and means for longitudinally adjusting said shaft.

8. In combination, an inclined shaft, a disc having a supporting surface disposed perpendicular to the axis of said shaft, means for delivering liquid filled containers in succession to and from said surface, means for rotating said disc through said shaft, means for varying the inclination of said shaft, and means for longitudinally adjusting said shaft.

9. In combination, a movable support having an upper surface formed to sustain open topped containers in tilted position, means for feeding a succession of liquid filled containers to said support, and means for adjusting the elevation of said surface relatively to said feeding means.

10. In combination, a movable support having an upper surface formed to sustain open topped containers in tilted position, means for feeding a succession of liquid filled containers to said support, means for adjusting the elevation of said surface relatively to said feeding means and means for varying the inclination of said surface.

11. In combination, a revolving support having an upper inclined surface formed to sustain open topped containers in tilted position, means for delivering a succession of liquid filled containers to said support, means for delivering said containers from said support, means for varying the elevation of said surface relative to said delivery means, and means for varying the inclination of said surface.

12. In combination, an inclined shaft, a disc having a supporting surface disposed perpendicular to the axis of said shaft, means for delivering liquid filled containers in succession to and from said surface at diametrically opposite horizontally alined portions of said disc, means for rotating said disc through said shaft, and means for varying the inclination of said shaft about an axis alined with said horizontally alined portions of said disc.

13. In combination, a supporting disc rotatable about an inclined axis, means for delivering liquid filled containers in succession to and from the inclined supporting surface of said disc at diametrically opposite horizontally alined portions thereof, and means for varying the inclination of said disc about an axis alined with said horizontally alined disc portions.

14. In combination, a supporting disc rotatable about an inclined axis, means for delivering liquid filled containers in succession to and from the inclined supporting surface of said disc at diametrically opposite peripheral portions thereof and in a common horizontal plane, and means for varying the inclination of said axis about a horizontal axis lying in said plane.

15. In combination, a disc having an inclined supporting surface revolvable about an inclined axis, means for delivering liquid filled containers to and from said surface at horizontally alined opposite portions of said disc, and means for varying the inclination of said surface about an axis intersecting the disc axis and lying in the plane of said horizontally alined portions.

16. In combination, a supporting disc having a movable inclined upper surface formed to sustain open topped containers in tilted position, means for varying the inclination of said surface, means for delivering liquid filled containers in succession to and from said disc surface, and means for effecting relative vertical adjustment of said surface and of said delivery means.

17. In combination, a supporting disc rotatable about an inclined axis, means for varying the inclination of said axis, means for delivering liquid filled containers in succession to and from the inclined supporting surface of said disc, and means for effecting variation in the relative elevation of the supporting surface of said disc and said delivery means.

18. In combination, an inclined shaft, means for varying the inclination of said shaft, a disc having a supporting surface disposed perpendicular to the axis of said shaft, means for delivering liquid filled containers in succession to and from said surface, means for rotating said disc through said shaft, and means for effecting relative adjustment of said surface and said delivery means to vary the relative elevations thereof.

FRANK D. CHAPMAN.